(12) United States Patent
Tsai

(10) Patent No.: US 11,624,889 B2
(45) Date of Patent: Apr. 11, 2023

(54) FLUORESCENT COLOR WHEEL

(71) Applicant: DELTA ELECTRONICS, INC., Taoyuan (TW)

(72) Inventor: Yi-Ting Tsai, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/449,459

(22) Filed: Sep. 30, 2021

(65) Prior Publication Data
US 2022/0404575 A1    Dec. 22, 2022

(30) Foreign Application Priority Data

Jun. 18, 2021   (CN) .......................... 202110675852.0

(51) Int. Cl.
*G02B 7/00* (2021.01)
*G03B 21/16* (2006.01)
*G03B 21/20* (2006.01)
*G02B 26/00* (2006.01)

(52) U.S. Cl.
CPC ........... *G02B 7/008* (2013.01); *G02B 26/008* (2013.01); *G03B 21/16* (2013.01); *G03B 21/204* (2013.01)

(58) Field of Classification Search
CPC .... G03B 21/204; G03B 21/16; G02B 26/008; G02B 7/008
See application file for complete search history.

(56) References Cited

U.S. PATENT DOCUMENTS

| 10,520,800 B2 | 12/2019 | Ikeo | |
|---|---|---|---|
| 10,845,686 B2 | 11/2020 | Ikeo | |
| 2015/0241046 A1* | 8/2015 | Hagemann | F21V 14/08 362/84 |
| 2017/0293211 A1* | 10/2017 | Kobayashi | G03B 21/16 |
| 2019/0094671 A1* | 3/2019 | Ikeo | G02B 26/008 |

FOREIGN PATENT DOCUMENTS

CN    209624966 U    11/2019

* cited by examiner

*Primary Examiner* — Evan P Dzierzynski
*Assistant Examiner* — Nathaniel J Lee
(74) *Attorney, Agent, or Firm* — CKC & Partners Co., LLC

(57) ABSTRACT

A fluorescent color wheel includes a substrate, a phosphor layer, and a fan blade structure. The substrate has a front surface, a rear surface opposite to the front surface, and a plurality of through holes communicating the front surface and the rear surface. The phosphor layer is disposed on the front surface. The fan blade structure includes a heat-dissipating plate and a plurality of first fan blades. The heat-dissipating plate has a first surface attached to the rear surface of the substrate. The first fan blades are disposed on the first surface and respectively pass through the through holes to protrude out from the front surface of the substrate.

11 Claims, 6 Drawing Sheets

FLUORESCENT COLOR WHEEL

CROSS-REFERENCE TO RELATED APPLICATION

This application claims priority to China Application Serial Number 202110675852.0, filed Jun. 18, 2021, which is herein incorporated by reference.

BACKGROUND

Technical Field

The present disclosure relates to a fluorescent color wheel.

Description of Related Art

In recent years, optical projectors have been used in many fields, and the scope of applications is also expanding day by day (e.g., from consumer products to high-tech equipment). Various optical projectors are also widely used in schools, homes and commercial occasions to enlarge the display pattern provided by the signal source and display it on the projection screen.

For the light source configuration of an optical projector, light can be generated by a fluorescent material excited by a solid-state laser light source. In this regard, the fluorescent material can be coated on the wheel, and the motor can be used to drive the wheel to rotate at a high speed, so that energy of the laser light source received by a local part of the fluorescent material in a unit time is reduced, thereby achieving the purpose of heat dissipation. However, as the brightness requirements of optical projectors continue to increase, the heat dissipation requirements for fluorescent materials have become increasingly stringent.

Accordingly, how to make the wheel and the fluorescent material thereon have a better way of heat dissipation becomes an important issue to be solved by those in the industry.

SUMMARY

An aspect of the disclosure is to provide a fluorescent color wheel that can efficiently solve the aforementioned problems.

According to an embodiment of the disclosure, a fluorescent color wheel includes a substrate, a phosphor layer, and a fan blade structure. The substrate has a front surface, a rear surface opposite to the front surface, and a plurality of through holes communicating the front surface and the rear surface. The phosphor layer is disposed on the front surface. The fan blade structure includes a heat-dissipating plate and a plurality of first fan blades. The heat-dissipating plate has a first surface attached to the rear surface of the substrate. The first fan blades are disposed on the first surface and respectively pass through the through holes to protrude out from the front surface of the substrate.

In an embodiment of the disclosure, the phosphor layer is located between an outer edge of the substrate and the first fan blades.

In an embodiment of the disclosure, the first fan blades are located between an outer edge of the substrate and the phosphor layer.

In an embodiment of the disclosure, the first fan blades are respectively engaged with the through holes.

In an embodiment of the disclosure, the first fan blades are perpendicular to the first surface.

In an embodiment of the disclosure, the heat-dissipating plate further has a second surface opposite to the first surface. The fan blade structure further includes a plurality of second fan blades. The second fan blades are disposed on the second surface.

In an embodiment of the disclosure, an orthographic projection of one of the second fan blades on the front surface at least partially overlaps the phosphor layer.

In an embodiment of the disclosure, the fluorescent color wheel further includes a thermally conductive material. The thermally conductive material is bonded between the first surface of the heat-dissipating plate and the rear surface of the substrate.

In an embodiment of the disclosure, the fluorescent color wheel further includes a first alignment structure and a second alignment structure. The first alignment structure is disposed on the substrate. The second alignment structure is disposed on the heat-dissipating plate and aligned with the first alignment structure.

In an embodiment of the disclosure, each of the first alignment structure and the second alignment structure is a locking hole. The fluorescent color wheel further includes a locking member. The locking member is fastened in the locking holes.

According to an embodiment of the disclosure, a fluorescent color wheel includes a substrate, a phosphor layer, and a fan blade structure. The substrate has a front surface, a rear surface opposite to the front surface, and a plurality of through holes communicating the front surface and the rear surface. The phosphor layer is disposed on the front surface. The fan blade structure includes a heat-dissipating plate, a plurality of first fan blades, and a plurality of second fan blades. The heat-dissipating plate is disposed on the rear surface of the substrate. The first fan blades are disposed on the heat-dissipating plate and respectively protrude out from the through holes. The second fan blades are disposed on the heat-dissipating plate and extend away from the substrate. The phosphor layer is located between an outer edge of the substrate and the through holes, or the through holes are located between the outer edge of the substrate and the phosphor layer.

Accordingly, in the fluorescent color wheel of the present disclosure, the phosphor layer is disposed on the front surface of the substrate, the heat-dissipating plate of the fan blade structure is attached to the rear surface of the substrate, and the first fan blades of the fan blade structure pass through the through holes of the substrate to be located on the same side of the substrate as the phosphor layer. Therefore, when the fluorescent color wheel rotates, the first fan blades located on the same side of the substrate as the phosphor layer can drive the air to directly flow through the phosphor layer, so that the heat thereon is directly transferred to the air in the manner of thermal convection, thereby achieving the effect of direct heat dissipation. Not only that, the second fan blades of the fan blade structure are disposed on the side of the heat-dissipating plate away from the substrate. Therefore, the heat of the phosphor layer is also transferred to the heat-dissipating plate in the manner of thermal conduction, then transferred to the first fan blades and the second fan blades, and finally transferred to the air in the form of thermal convection with the rotation of the fluorescent color wheel. In this way, the fluorescent color wheel with the aforementioned multiple ways of heat dissipation can effectively increase the heat dissipation efficiency, and can be used with higher power light sources. In addition, by engaging the through holes with the first fan blades, the initial assembly between the substrate and the fan blade structure can be easily completed, and the relative rotation of the two during the rotation of the fluorescent color wheel can be avoided, thereby increasing the overall structural stability of the fluorescent color wheel.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
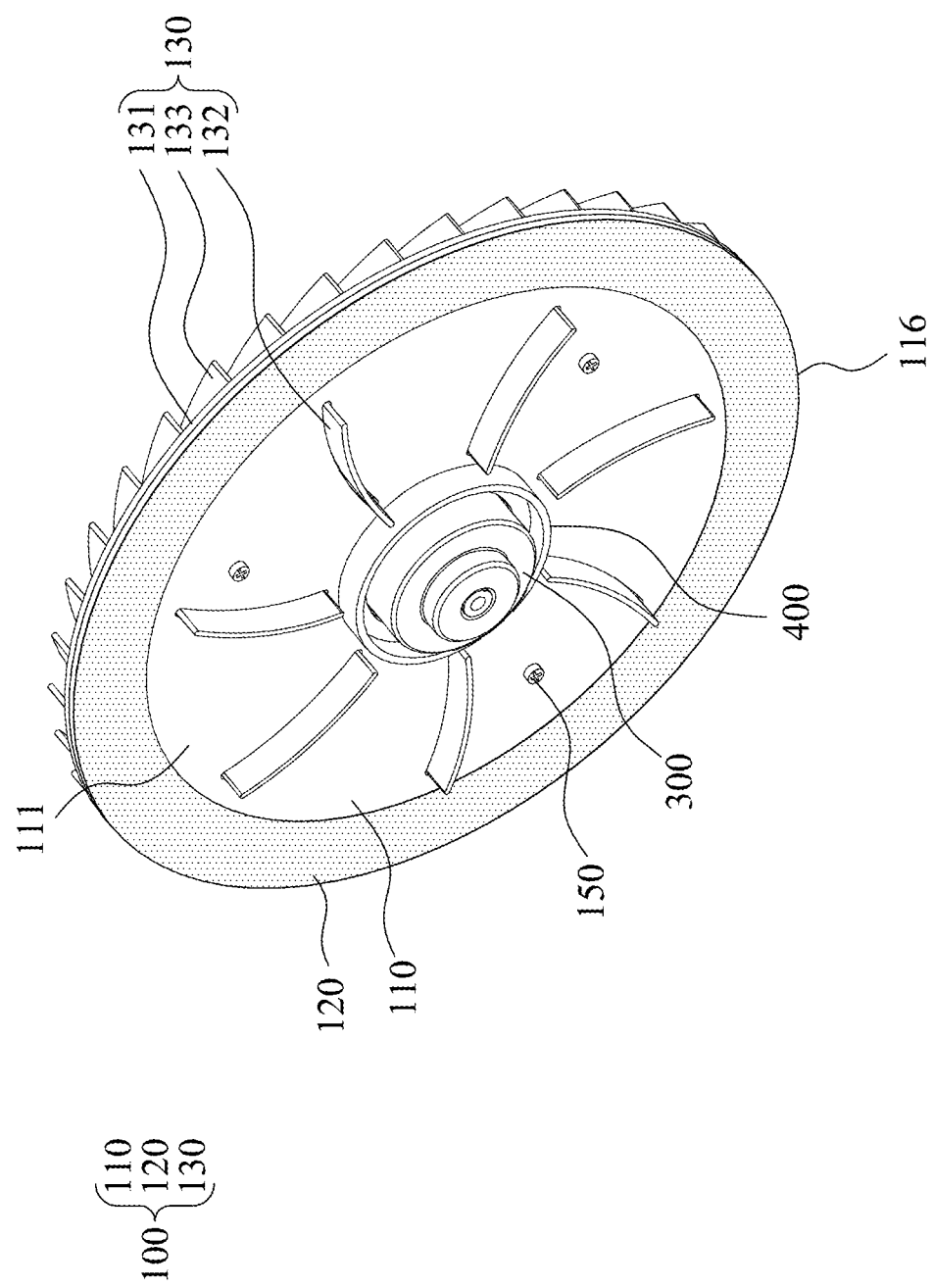
FIG. 1A is a perspective view of a fluorescent color wheel and a motor according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1B:
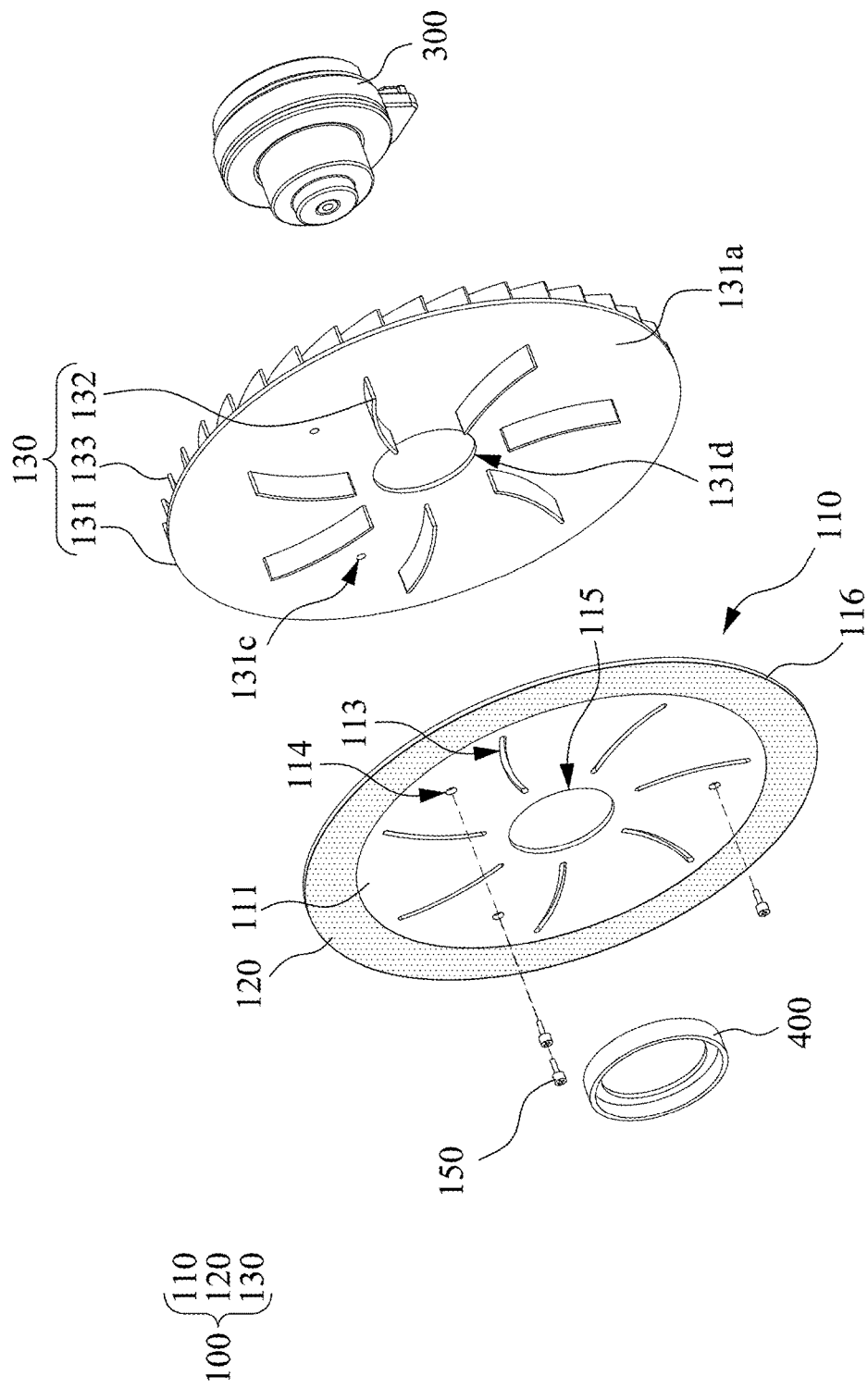
FIG. 1B is an exploded view of the fluorescent color wheel and the motor in FIG. 1A.
Figure 2:
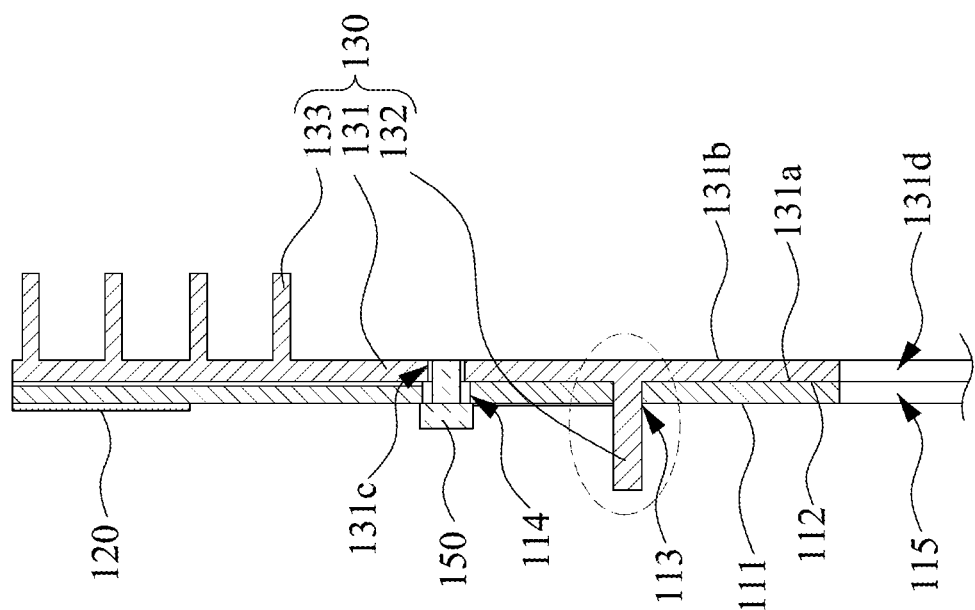
FIG. 2 is a partial cross-sectional view of the fluorescent color wheel in FIG. 1A.

Reference is made to FIG. 1A-2. FIG. 1A is a perspective view of a fluorescent color wheel 100 and a motor 300 according to an embodiment of the present disclosure. FIG. 1B is an exploded view of the fluorescent color wheel 100 and the motor 300 in FIG. 1A. FIG. 2 is a partial cross-sectional view of the fluorescent color wheel 100 in FIG. 1A. In the present embodiment, the fluorescent color wheel 100 includes a substrate 110 and a phosphor layer 120. The substrate 110 has a front surface 111 and a rear surface 112 opposite to each other. The phosphor layer 120 is disposed on the front surface 111. In addition, the substrate 110 further has an assembly hole 115, and the heat-dissipating plate 131 further has an assembly hole 131d. The assembly holes 115, 131d are aligned and communicated with each other, and are respectively located in the center of the substrate 110 and the heat-dissipating plate 131. The motor 300 is connected to the inner wall of at least one of the assembly holes 115, 131d, and is configured to rotate the fluorescent color wheel 100. The phosphor layer 120 has a ring shape and may include one or more phosphor areas of different colors. In this way, the fluorescent color wheel 100 can be applied to a projector and used as a wavelength conversion device. Specifically, when the light source of the projector emits light to the phosphor layer 120 of the fluorescent color wheel 100, the phosphor areas of different colors will be excited by the light to produce different colors, thereby achieving the effect of wavelength conversion.

After the light from the light source is irradiated to the phosphor layer 120 for a long time, a large amount of heat will be accumulated on the phosphor layer 120. If the heat is not conducted away in time, the wavelength conversion efficiency of the phosphor layer 120 will deteriorate. The specific heat dissipation mechanism of the fluorescent color wheel 100 of the present embodiment will be described below.

As shown in FIGS. 1A-2, in the present embodiment, the substrate 110 further includes a plurality of through holes 113. The through holes 113 communicate the front surface 111 and the rear surface 112 of the substrate 110. The fluorescent color wheel 100 further includes a fan blade structure 130. The fan blade structure 130 includes a heat-dissipating plate 131 and a plurality of first fan blades 132. The heat-dissipating plate 131 has a first surface 131a attached to the rear surface 112 of the substrate 110. The first fan blades 132 are disposed on the first surface 131a and respectively pass through the through holes 113 to protrude out from the front surface 111 of the substrate 110. In other words, the first fan blades 132 of the fan blade structure 130 pass through the through holes 113 of the substrate 110 to be located on the same side of the substrate 110 as the phosphor layer 120.

With the aforementioned structural configuration, when the fluorescent color wheel 100 rotates, the first fan blades 132 located on the same side of the substrate 110 as the phosphor layer 120 can drive the air to directly flow through the phosphor layer 120, so that the heat thereon can be directly transferred to the air in the manner of thermal convection, thereby achieving the effect of direct heat dissipation. Not only that, the heat of the phosphor layer 120 can also be transferred to the heat-dissipating plate 131 in the manner of thermal conduction, then transferred to the first fan blades 132, and finally transferred to the air in the form of thermal convection with the rotation of the fluorescent color wheel 100. In this way, the fluorescent color wheel 100 with the aforementioned two ways of heat dissipation can effectively increase the heat dissipation efficiency, and can be used with higher power light sources.

In some embodiments, the material of the fan blade structure 130 includes metal or non-metal (for example, thermally conductive ceramics), but the disclosure is not limited thereto.

When assembling the fluorescent color wheel 100, the first fan blades 132 of the fan blade structure 130 can be respectively aligned with and pass through the through holes 113 on the substrate 110 until the first surface 131a of the heat-dissipating plate 131 abuts against the rear surface 112 of the substrate 110. As shown in FIG. 2, in the present embodiment, the first fan blades 132 are respectively engaged with the through holes 113. In detail, at least a part of the inner wall of a through hole 113 may abut against a part of the outer surface of a first fan blade 132. In this way, the initial assembly between the substrate 110 and the fan blade structure 130 can be easily completed, and the relative rotation of the two during the rotation of the fluorescent color wheel 100 can be avoided, thereby increasing the overall structural stability of the fluorescent color wheel 100.

As shown in FIG. 2, in the present embodiment, the first fan blades 132 can be designed to be perpendicular to the first surface 131a of the heat-dissipating plate 131, and the inner walls of the through holes 113 can be designed to be perpendicular to the rear surface 112 of the substrate 110. Therefore, when the fluorescent color wheel 100 is assembled, the assembly direction of the fan blade structure 130 relative to the substrate 110 can be parallel to the first fan blades 132 and the inner walls of the through holes 113. In this way, the size of the through holes 113 can be designed to be smaller, so as to be more closely engaged with the first fan blades 132.

In other embodiments, the size of the through holes 113 on the substrate 110 may be larger, so that the inner walls of the through holes 113 are separated from the first fan blades 132, which will help the first fan blades 132 of non-vertical type to pass through the through holes 113, or considers the allowable amount of thermal expansion effect in actual use.

As shown in FIG. 2, in the present embodiment, the heat-dissipating plate 131 further has a second surface 131b opposite to the first surface 131a. The fan blade structure 130 further includes a plurality of second fan blades 133. The second fan blades 133 are disposed on the second surface 131b of the heat-dissipating plate 131. In other words, the second fan blades 133 are disposed on a side of the heat-dissipating plate 131 away from the substrate 110 and extend away from the substrate 110. With this structural configuration, the heat of the phosphor layer 120 is further transferred to the heat-dissipating plate 131 in the manner of thermal conduction, then transferred to the second fan blades 133, and finally transferred to the air in the form of thermal convection with the rotation of the fluorescent color wheel 100. It should be noted that one of the main functions of the heat-dissipating plate 131 is to carry the first fan blades 132 and the second fan blades 133 at the same time. Therefore, the structure of the heat-dissipating plate 131 is not necessarily circular plate-shaped as in the previous embodiment. In other embodiments, the heat-dissipating plate 131 can also be in the shape of an annular plate (not shown in the figure), and the first fan blades 132 and the second fan blades 133 are disposed on both sides, which can also achieve the effect of the present disclosure.

Figure 3:
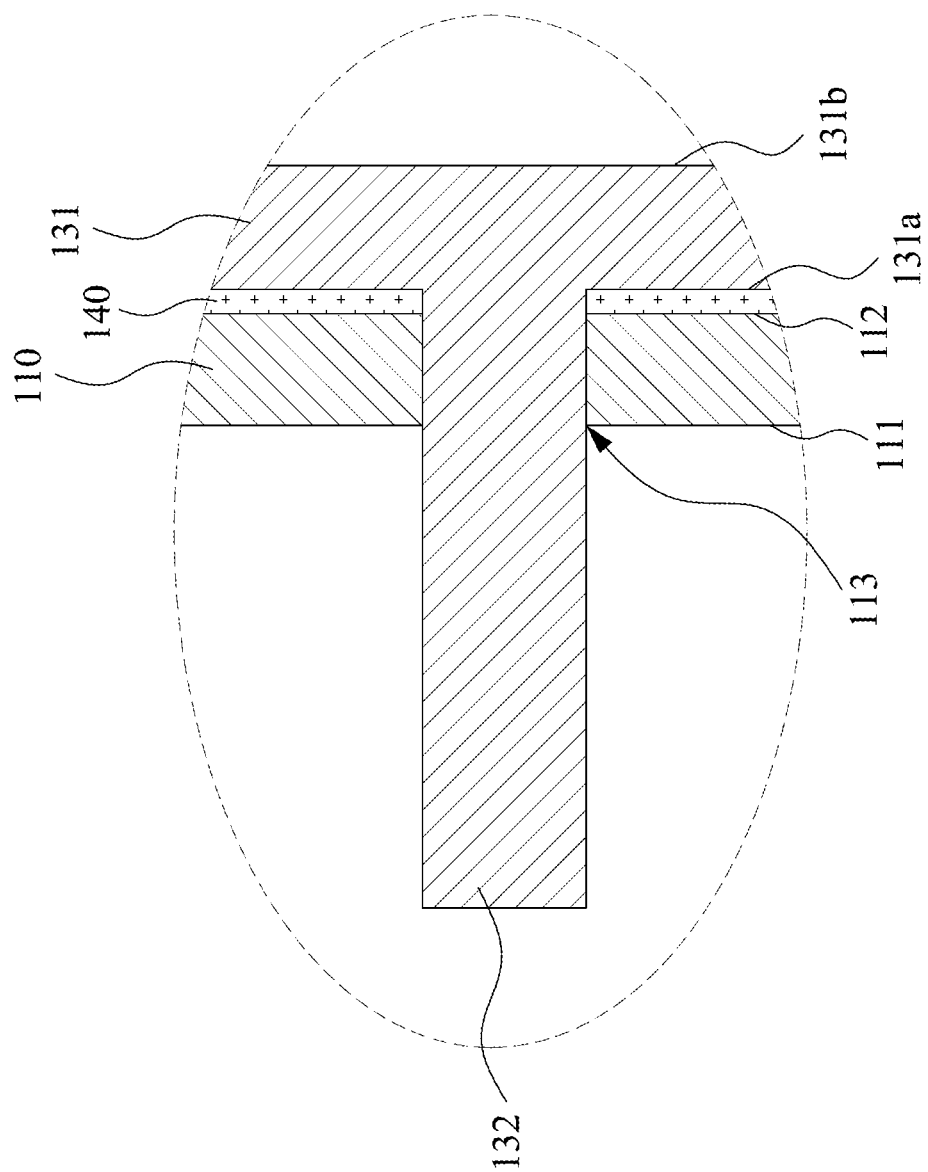
FIG. 3 is a partial enlarged view of the structure in FIG. 2.

Reference is made to FIG. 3. FIG. 3 is a partial enlarged view of the structure in FIG. 2. As shown in FIG. 3, in the present embodiment, the fluorescent color wheel 100 further includes a thermally conductive material 140. The thermally conductive material 140 is bonded between the first surface 131a of the heat-dissipating plate 131 and the rear surface 112 of the substrate 110. Hence, the thermally conductive material 140 can effectively reduce the thermal resistance between the heat-dissipating plate 131 and the substrate 110, thereby further increasing the heat dissipation efficiency of the fluorescent color wheel 100.

In some embodiments, the thermally conductive material 140 includes metal or a metal paste material, but the disclosure is not limited thereto. When the thermally conductive material 140 is a metal paste material, the stability of the substrate 110 attached to the heat-dissipating plate 131 can be increased, and friction among structures caused by vibration during the operation of the motor 300 can be avoided. In some embodiments, the aforementioned metal or metal paste material includes silver, copper, tin, etc., but the disclosure is not limited thereto.

Figure 4:
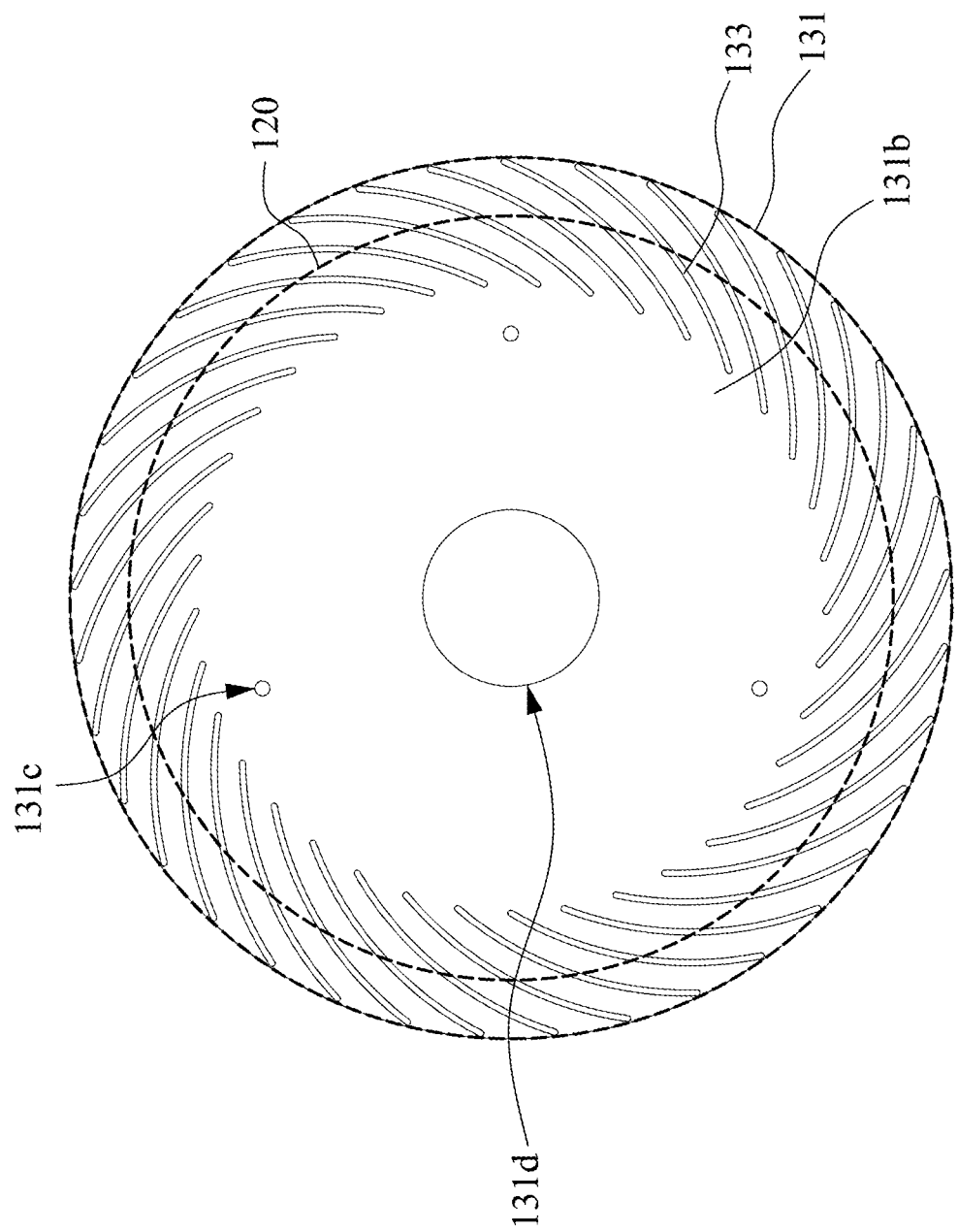
FIG. 4 is a rear view of the fluorescent color wheel in FIG. 1A.

Reference is made to FIG. 4. FIG. 4 is a rear view of the fluorescent color wheel 100 in FIG. 1A. As shown in FIG. 4, in the present embodiment, orthographic projections of the second fan blades 133 (indicated by dotted lines in FIG. 4) on the front surface 111 at least partially overlaps the phosphor layer 120. In this way, the thermal conduction distance between the phosphor layer 120 and the second fan blades 133 can be reduced, so that the thermal resistance between the phosphor layer 120 and the second fan blades 133 can be reduced more effectively.

As shown in FIGS. 1A-2, in the present embodiment, the fluorescent color wheel 100 further includes first alignment structures 114 and second alignment structures 131c. The first alignment structures 114 are disposed on the substrate 110. The second alignment structures 131c are disposed on the heat-dissipating plate 131 and aligned with the first alignment structures 114, respectively. Each of the first alignment structures 114 and the second alignment structures 131c is a locking hole. The fluorescent color wheel 100 further includes locking members 150. The locking members 150 are fastened in the locking holes. For example, as shown in FIG. 2, the locking members 150 are screws. The first alignment structures 114 are holes with a larger diameter. The second alignment structures 131c are screw holes with a smaller diameter. The locking members 150 pass through the first alignment structures 114 and are screwed to the second alignment structures 131c, thereby locking the substrate 110 and the heat-dissipating plate 131 to each other.

In some other embodiments, the first alignment structures 114 are disposed on the rear surface 112 of the substrate 110, and the second alignment structures 131c are disposed on the first surface 131a of the heat-dissipating plate 131. One of the first alignment structure 114 and the second alignment structure 131c is a bump structure, and another of the first alignment structure 114 and the second alignment structure 131c is a recess structure, so that the substrate 110 and the heat-dissipating plate 131 are mutually positioned.

As shown in FIG. 1A and FIG. 1B, in the present embodiment, the housing of the motor 300 may be provided with an external thread, and configured to be screwed with a fixing ring 400 having an internal thread. By making the fixing ring 400 abut against the front surface 111 of the substrate 110, making a part of the housing of the motor 300 abut against the second surface 131b of the heat-dissipating plate 131, and locking the fixing ring 400 and the housing of the motor 300 to each other, the fluorescent color wheel 100 and the motor 300 can be fixed to each other.

Figure 5:
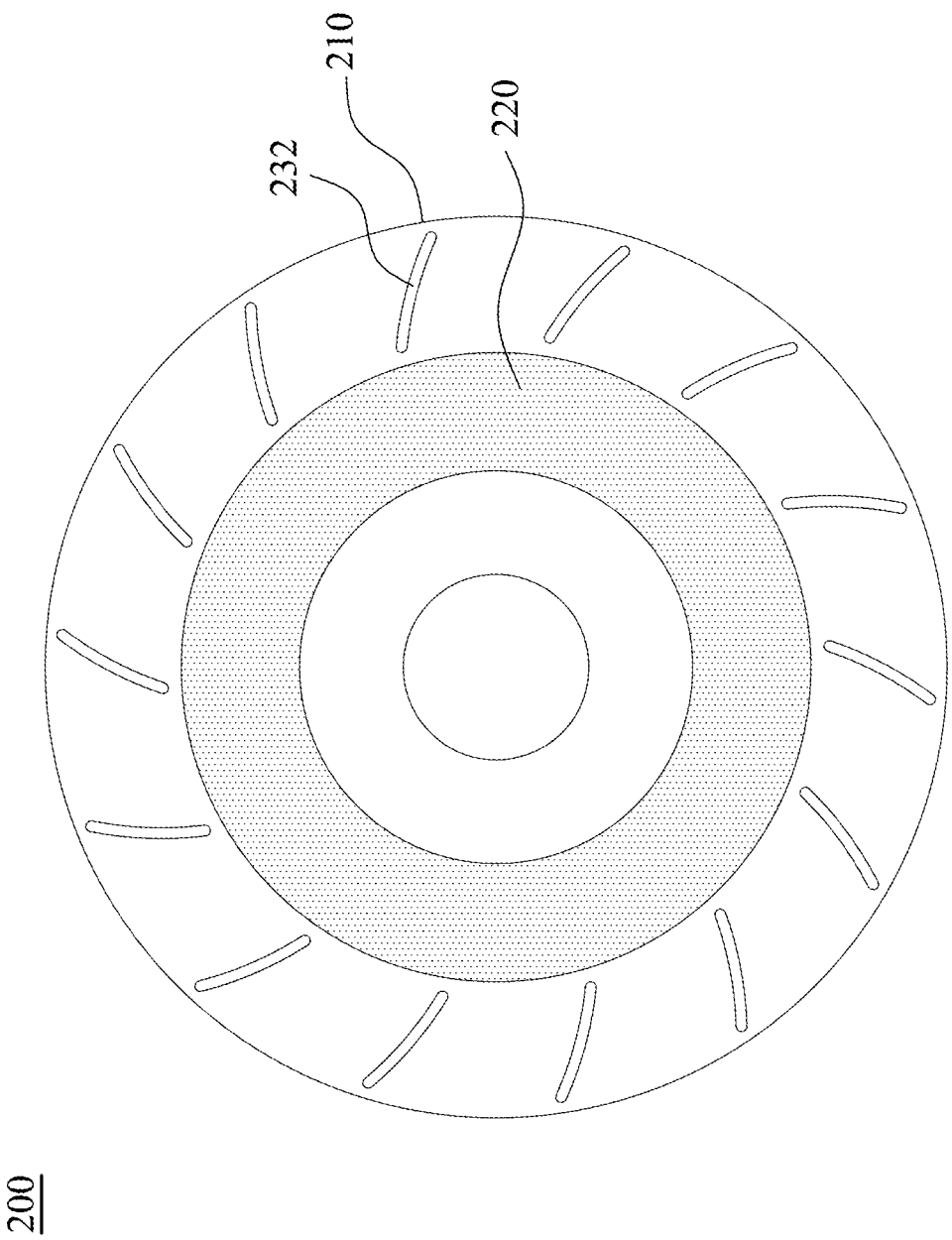
FIG. 5 is a front view of a fluorescent color wheel according to another embodiment of the present disclosure.

As shown in FIG. 1A, in the present embodiment, the phosphor layer 120 is located between an outer edge 116 of the substrate 110 and the first fan blades 132, but the disclosure is not limited thereto. Reference is made to FIG. 5. FIG. 5 is a front view of a fluorescent color wheel 200 according to another embodiment of the present disclosure. A difference between this embodiment and the embodiment shown in FIG. 1A is that this embodiment modifies the relative positions of the first fan blades 132 and the phosphor layer 120 on the substrate 110 in FIG. 1A. Specifically, in this embodiment, the first fan blades 232 are located between an outer edge 216 of the substrate 210 and the phosphor layer 220. When the fluorescent color wheel 100 in FIG. 1A rotates, the airflow generated by the first fan blades 132 will blow to the outer phosphor layer 120, thereby forcibly bringing the heat on the phosphor layer 120 into the air. When the fluorescent color wheel 200 of this embodiment rotates, the airflow generated by the first fan blades 232 will be sucked away from the inner phosphor layer 220, and the heat on the phosphor layer 220 will be forced into the air.

According to the foregoing recitations of the embodiments of the disclosure, it can be seen that in the fluorescent color wheel of the present disclosure, the phosphor layer is disposed on the front surface of the substrate, the heat-dissipating plate of the fan blade structure is attached to the rear surface of the substrate, and the first fan blades of the fan blade structure pass through the through holes of the substrate to be located on the same side of the substrate as the phosphor layer. Therefore, when the fluorescent color wheel rotates, the first fan blades located on the same side of the substrate as the phosphor layer can drive the air to directly flow through the phosphor layer, so that the heat thereon is directly transferred to the air in the manner of thermal convection, thereby achieving the effect of direct heat dissipation. Not only that, the second fan blades of the fan blade structure are disposed on the side of the heat-dissipating plate away from the substrate. Therefore, the heat of the phosphor layer is also transferred to the heat-dissipating plate in the manner of thermal conduction, then transferred to the first fan blades and the second fan blades, and finally transferred to the air in the form of thermal convection with the rotation of the fluorescent color wheel. In this way, the fluorescent color wheel with the aforementioned multiple ways of heat dissipation can effectively increase the heat dissipation efficiency, and can be used with higher power light sources. In addition, by engaging the through holes with the first fan blades, the initial assembly between the substrate and the fan blade structure can be easily completed, and the relative rotation of the two during the rotation of the fluorescent color wheel can be avoided, thereby increasing the overall structural stability of the fluorescent color wheel.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fluorescent color wheel, comprising:
   a substrate having a front surface, a rear surface opposite to the front surface, and a plurality of through holes communicating the front surface and the rear surface;
   a phosphor layer disposed on the front surface; and
   a fan blade structure comprising:
      a heat-dissipating plate having a first surface attached to the rear surface of the substrate, wherein the heat-dissipating plate entirely covers the through holes; and
      a plurality of first fan blades disposed on the first surface and respectively passing through the through holes to protrude out from the front surface of the substrate.

2. The fluorescent color wheel of claim 1, wherein the phosphor layer is located between an outer edge of the substrate and the first fan blades.

3. The fluorescent color wheel of claim 1, wherein the first fan blades are located between an outer edge of the substrate and the phosphor layer.

4. The fluorescent color wheel of claim 1, wherein the first fan blades are respectively engaged with the through holes.

5. The fluorescent color wheel of claim 1, wherein the first fan blades are perpendicular to the first surface.

6. The fluorescent color wheel of claim 1, wherein the heat-dissipating plate further has a second surface opposite to the first surface, the fan blade structure further comprises a plurality of second fan blades, and the second fan blades are disposed on the second surface.

7. The fluorescent color wheel of claim 6, wherein an orthographic projection of one of the second fan blades on the front surface at least partially overlaps the phosphor layer.

8. The fluorescent color wheel of claim 1, further comprising a thermally conductive material bonded between the first surface of the heat-dissipating plate and the rear surface of the substrate.

9. The fluorescent color wheel of claim 1, further comprising:
   a first alignment structure disposed on the substrate; and
   a second alignment structure disposed on the heat-dissipating plate and aligned with the first alignment structure.

10. The fluorescent color wheel of claim 9, wherein each of the first alignment structure and the second alignment structure is a locking hole, the fluorescent color wheel further comprises a locking member, and the locking member is fastened in the locking holes.

11. A fluorescent color wheel, comprising:
    a substrate having a front surface, a rear surface opposite to the front surface, and a plurality of through holes communicating the front surface and the rear surface;
    a phosphor layer disposed on the front surface; and
    a fan blade structure comprising:
       a heat-dissipating plate disposed on the rear surface of the substrate, wherein the heat-dissipating plate entirely covers the through holes;
       a plurality of first fan blades disposed on the heat-dissipating plate and respectively protruding out from the through holes; and
       a plurality of second fan blades disposed on the heat-dissipating plate and extending away from the substrate,
    wherein the phosphor layer is located between an outer edge of the substrate and the through holes, or the through holes are located between the outer edge of the substrate and the phosphor layer.

* * * * *